United States Patent Office 3,219,582
Patented Nov. 23, 1965

3,219,582
LUBRICANTS AND FUELS CONTAINING SACCHARIDE POLYDICARBOXYLATE HALF-ESTERS
Van R. Gaertner, Ballwin, Mo., assignor to Monsanto Company, a corporation of Delaware
No Drawing. Original application Feb. 27, 1961, Ser. No. 91,627. Divided and this application Apr. 22, 1963, Ser. No. 274,816
12 Claims. (Cl. 252—34)

This application is a division of Van R. Gaertner application S.N. 91,627, filed on February 27, 1961, in which the referred-to half-esters and their preparation are claimed.

The present invention is directed to light petroleum products containing small amounts of long chain dicarboxylic acid poly half-esters of mono- and disaccharides.

The term saccharide is used herein to include sugar alcohols, i.e., such polyols as sorbitol, as well as sugars themselves.

The present invention is concerned with sugars having more than one long chain $\alpha,\beta$-dicarboxylic acid ester group for each sugar molecule and having only one of the carboxyl groups of the dicarboxylic acid esterified with the sugar; i.e., the invention concerns poly-O-($\beta$-carboxyacyl) sugars in which the acyl group has a long chain hydrophoibic group, generally a hydrocarbyl group. It is essential in the compositions of the present invention to have at least two such O-acyl groups for each sugar molecule in order to have the desired hydrocarbon solubility and various useful properties as described herein below. It will be recognized that the term long chain as used herein includes higher molecular weight groups whether of branched, forked or straight chain structure.

The compounds utilized in the compositions of the present invention can be represented by the formula:

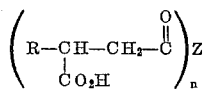

in which R represents an aliphatic radical of 6 to 20 or more carbon atoms (making the acyl group 10 to 24 or more carbon atoms), $n$ is a number from at least 2 up to 8 or whatever number of acyl groups are required for complete acylation of the hydroxyl groups of the mono- or disaccharide of which Z represents the residue. R is preferably an aliphatic hydrocarbon radical, although it can contain ether, carboxylic acid ester, keto or similar oxygen-containing groups which do not interfere in the esterification reaction by which the compounds are prepared or have undesirable effects on the properties of the compounds. As aliphatic hydrocarbon radicals, both saturated and unsaturated radicals are suitable, as well as straight, forked and branched chains of various types, for example R can be tetradecyl, hexadec-1-en-1-yl, hexadec-3-en-1-yl, hexadec-15-en-1-yl, hexadec-2-en-1-yl, dodec-2-en-1-yl, pentadec-2-en-1-yl, octadec-2-en-1-yl, pentadec-6-yl, dodecyl, decyl, nonadec-9-en-9-yl, nonadec-11-en-9-yl, etc. It is often convenient to use branched-chain alkenyl groups resulting from condensation of various olefins, and $\alpha,\beta$-dicarboxylic acids containing such alkenyl groups can conveniently be obtained by condensing mono-olefins, alkyl chlorides, or aliphatic alcohols with $\alpha,\beta$-unsaturated acid anhydrides or the esters thereof in the manner described in Patents No. 2,283,214 and No. 2,380,699 to Lucas P. Kyrides. It is particularly preferred to use the condensation products of olefins such as diisobutylene, triisobutylene, tetraisobutylenes, or tetrapropylenes, etc., with maleic acid or maleic anhydride. The aforenamed polyalkylenes can, for example, be prepared by polymerization of isobutylene or propylene with sulfuric acid or metallic halides, or result from simultaneous dehydration and polymerization of tertiary butyl alcohol or isopropyl alcohol by concentrated sulfuric acid. In the products of the olefin and maleic acid or maleic anhydride condensation, the unsaturation is retained in the olefinic residue, e.g., the triisobutylene or tetrapropylene residue.

While most of the esterification will occur on the carboxyl group as illustrated in the above formula, it will be realized that esterification can also occur on the other carbon atom to give an isomeric form and both forms are part of the present invention.

Z in the above formula represents the carbohydrate portion of the molecule, i.e., a mono- or disaccharide radical having $n$ valences (located at the oxygen atoms at which the acyl groups replace hydroxyl hydrogen in the compound).

The carbohydrates used in preparing the compounds utilized in the present invention include simple sugars, sugar alcohols, $\alpha$- or $\beta$-glycosides, reducing or non-reducing disaccharides, etc. Such sugars and sugar alcohols contain at least four hydroxyl groups and have all of their carbon atoms attached to at least one oxygen atom, and ordinarily do not have a molecular weight greater than about 500. Suitable carbohydrates are, for example, the aldo- and keto-tetroses, pentoses, and hexoses, and their corresponding polyols and glycoside derivatives, e.g., glucose, D-fructose, L-xylose, methyl-$\alpha$- D-glucoside, sorbitol, $\beta$-methyl-D-glucoside, $\beta$-methylfructoside, $\gamma$-methylglucoside, $\alpha$-methyl-L-fructoside, D-mannitol, D-arabitol, xylitol, etc., and various disaccharides, e.g., sucrose, maltose, lactose, etc.

The new compounds are essentially monomeric in character, i.e., each carbohydrate portion is bonded to more than one long chain dicarboxylic acid residue, but, as a rule, a single dicarboxylic acid residue is bonded to only one carbohydrate molecule.

While the present invention is mainly concerned with compounds as represented by the structural formula hereinabove, in which the dicarboxylic acid radicals contain one free carboxyl group, it also includes such compounds in which the hydrogen of the carboxyl group is replaced by metal or amine salt cations or esterifying groups, i.e., it includes the salt and ester derivatives of such compounds. Sodium, potassium, calcium, or other alkali and alkaline earth metal salts are readily prepared by neutralization, preferably under mild conditions. Amine salts are of particular interest for special applications, particularly long chain alkyl primary amines, including for example, both n-alkyl and tert-alkyl primary amines; tallow amines, i.e., amines prepared by reduction of amides of tallow acids, are especially suitable. The ester derivatives are suitable to some extent for the same purposes as the compounds containing the free carboxyl groups.

It will be recognized that the acid residues in the compounds of the present invention are residues of substituted succinic acids, i.e., of succinic acids having an alkyl, alkenyl or related substituent of 6 to 20 or more carbon atoms, e.g., of diisobutenylsuccinic acid, n-decyl-succinic acid, tetrapropenylsuccinic acid, tridecyloxysuccinic acid, isooctylsuccinic acid, tetraiosbutenylsuccinic acid, eicosylsuccinic acid, etc. The novel compounds of the present invention have two or more monovalent radicals of any of the foregoing succinic acids substituted as O-acyl groups on mono- or disaccharide molecules. Compounds included in the present invention are, for example, glucose bis(tetra - propenylsuccinate), sucrose tetrakis(tetrapropenylsuccinate), sucrose tris(triisobutenylsuccinate), sorbitol bis(tetrapropenylsuccinate), sucrose tetrakis(decylsuccinate) sucrose tetrakis(isooctylsuccinate), sucrose tris (oleylsuccinate), sucrose tetrakis(n-hexadecylsuccinate), sucrose tetrakis(succinate from methyl oleate-maleic anhydride adduct), sucrose tetradodecenyl tetrakis(tetrapropenylsuccinate), glucose, sucrose tetrakis(tetrapropenylsuccinate), etc., and various alkali and amine salts and esters of any of the foregoing.

While the novel compounds and compositions described herein are suitable for their contemplated uses regardless of the method of preparation, the process described below is particularly suitable for their preparation.

The process involves reacting mono- and disaccharides with more than one molar equivalent of long chain $\alpha,\beta$-dicarboxylic acid anhydrides under conditions suitable for polyesterification of the saccharide hydroxyls. The process is effected by contacting the saccharide with excess of the anhydride in the presence of amine catalyst. Heating is advisable to accelerate the reaction, temperatures of 50° C., up to the decomposition temperatures of the saccharides employed, perhaps about 190° C. When sucrose is the saccharide, temperatures of 50° C., or possibly 100° C., up to 170° C., or 175° C., are suitable. If the reactants are well dissolved in solvent, it is even possible to conduct the reaction at room temperature or below, but the reaction rate would be undesirably slow. A suitable procedure involves adding a selected succinic anhydride with heating to the carbohydrate in the presence of an amine catalyst, an excess (molar basis) of the succinic anhydride being employed. Solvent, addition rate, heating and stirring are employed as necessary to effect homogeneous solution to promote uniform acylation of the carbohydrate molecules. Dimethylformamide is particularly useful as a solvent in the present process, but various other solvents in which the selected anhydrides and carbohydrates are mutually soluble can be employed, basic or amine type solvents being most suitable, e.g., pyridine, dimethyl sulfoxide, etc.

In one particular embodiment of the invention, the carbohydrate is heated in bulk in the absence of any solvent, to a fused or fluid condition (if such can be obtained without decomposition) and then reacted with the long chain alkenylsuccinic anhydride (or similar succinic anhydride) in the presence of a tertiary amine. In effecting the esterification in bulk, it is desirable to use agitation as well as heat to attain a reasonably homogeneous reaction mixture. It is surprising to find that reasonably uniform results can thus be obtained without the use of solvent. While the esterification can also be suitably conducted in a solvent, there is definite economic advantage in avoiding a solvent removal step, this being especially true if traces of the solvent would be detrimental in the contemplated application. In order to lower the fusion point of a solventless reaction mixture, it is often desirable to use a lower melting sugar along with one of relatively higher melting point, e.g., a mixture of glucose and sucrose is readily esterified by excess of such anhydrides as tetrapropenylsuccinic anhydride in the absence of solvent and the resulting poly half-esters have valuable anti-rust and other properties as described hereinbelow. It will be appreciated that the number of carboxyacyl substituents per carbohydrate molecule will vary somewhat from molecule to molecule but the average will be in the 2 to 8 or so range described above. In general, it is necessary to have at least a certain number of hydrophobic groups from acyl radicals substituted on the carbohydrate in order to have the hydrocarbon solubility required for the purposes discussed below. The most desirable acyl numbers within the 2 to 8 range will vary somewhat with the particular carbohydrate and the size of the hydrophobic redical in the carboxyacyl group. In general, numbers in the higher end of the range, from 3 or 4 to 8, will be very suitable so far as properties are concerned. However, in order to avoid excessive use of the relatively expensive anhydride component, it is often desirable to have the number of carboxyacyl groups as low as possible with retention of desirable properties, usually in the 2 to 4 range. It will, in general, be necessary to have at least one carboxyacyl substituent for each hexose unit in the carbohydrate.

The process is conducted in the presence of amine catalysts which do not contain any reactive interfering groups, tertiary amines being particularly suitable. Trialkylamines in general are suitable, but it may be convenient to use the lower trialkylamines, e.g., triethylamine, trimethylamine, diethylhexylamine, and other alkylamines containing up to 6 carbon atoms in the alkyl groups; however, suitable tertiary amines can contain up to 20 or so carbon atoms in their alkyl groups. Similarly, the amines can contain cycloalkyl groups, e.g., diethylcyclohexylamine. Heterocyclic tertiary amines, such as pyridine and N-ethylpiperidine can also be employed. A particularly effective amine catalyst is triethylenediamine.

The best results are generally obtained by following the order of addition in which the anhydride is added to the mono- or disaccharide. When the mono- or disaccharide is gradually added to the anhydride, the first-formed acylation products are more soluble in the anhydride than the unsubstituted mono- or disaccharide tending to cause complete acylation of some mono- or disaccharide molecules and little or no acylation of others; however, if sufficient anhydride for complete acylation is employed, a relatively uniform product will be obtained. In the event the reaction is conducted in dilute solutions in good solvents for the reactants, the order of addition will not be as significant.

The present invention is illustrated by the following examples.

*Example 1*

A solution containing 0.03 mole sucrose and 0.1 gram triethylenediamine in 29 grams dimethylformamide was prepared, and 0.15 mole tetrapropenylsuccinic anhydride was added with stirring at 90° C., in about 20 minutes. About 0.4 gram more triethylenediamine was also added. The temperature of the reaction mixture was maintained circa 100° C., for about three hours. Dimethylformamide solvent was removed by aspiration to 0.1 mm. at 110° C., the product remaining sufficiently liquid for operation of a stirrer. The product was then dissolved by heating in 100 ml. hexane to give 134 grams of clear amber solution; from a 41 gram fraction of the hexane solution, hexane was removed by aspiration to give 16.5 grams of light tan powder, indicating a total yield of 54.1 grams of the sucrose penta(tetrapropenylsuccinate).

*Analysis.*—Calc'd: C, 65.9; H, 9.14. Found: C, 65.42; H, 9.41.

The neutral equivalent was 345, indicating about 4.85 of the succinate groups per sucrose molecule. The compound was evaluated for anti-rust activity, having a value of 10 (ASTM test D–665, M–400) at a dosage of 10 lbs./1000 barrels of straight-run gasoline, with an exposure of 24 hours. The rating values in the test are on a scale with 10 representing no rust and 0 representing complete rusting of the surface. A control under such conditions usually has a rating of 0 to 1. In a simulated hot manifold test, the deposit of materials from isooctane and straight-run gasoline fuels containing the compound was only about 15% greater than from the base fuels, indicating that deposition of the additive was not undesirably high. In a screen clogging test, the compound at 10 pounds per 1000 barrels of kerosene reduced clogging 91.6%, on a scale with 90 as excellent. In an anti-icing test, the compound added at a dosage of 15 pounds per 1000 barrels of winter grade gasoline slightly decreased the stalling and bucking of an engine under severe carburetor icing conditions.

*Example 2*

Tetrapropenylsuccinic anhydride and sucrose were reacted according to the procedure of Example 1 to obtain an ester having about 2.6 tetrapropenylsuccinate units per sucrose unit. The compound had a rating of 9.5 in an anti-rust test (ASTM test D-665, M-400) at a 10 lbs./1000 barrel dosage in straight run gasoline with 24 hour exposure. Deposition results in a simulated manifold test were also satisfactory, and the percentage reduction in the screen clogging test was 93.4%. The compound at a dosage of 15 pounds/1000 barrels in winter grade gasoline decreased the stalling and bucking of an engine under severe carburetor icing conditions.

*Example 3*

An adduct was prepared by heating equimolar quantities of methyl oleate and maleic anhydride at about 200° C., for five hours and distilling the product at 238–253° C., at 0.4–0.8 mm. The adduct is represented by the structural formula:

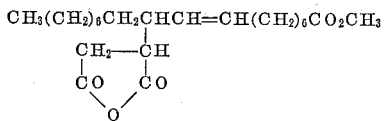

or some isomer thereof, perhaps with the double bond in the 10, 11 position of the oleate, and the succinic anhydride radical substituted on the 9 position. A 0.04 mole (based on the M.W. of 394.6) amount of the adduct was added dropwise to a stirred solution of 3.4 grams (0.01 mole) sucrose and 0.2 gram triethylenediamine in 15 ml. dimethylformamide at 60° C. The temperature was gradually raised to 115° C., and the dimethylformamide was distilled under vacuum. The product was purified by repeatedly treating with hexane and decanting the upper hexane layer. A sample was dried to 50° C., at 1 mm., and had a neutral equivalent of 442, indicating approximately 4 methyl oleate-maleate groups per sucrose molecule. At a dosage of 25 pounds/1000 barrels gasoline, the product had an anti-rust rating of 7.5 upon 24-hour exposure, which compares favorably with a rating of 0 to 1 for no additive; the percentage reduction of screen clogging at a 10 pound/1000 barrel dosage in kerosene was 77%.

*Example 4*

Sucrose, 0.02 mole, and n-hexadecenylsuccinic anhydride, 0.08 mole (25.8 grams), were reacted according to the procedure of example, employing a reaction temperature circa 100° C. A sample of the product redried at 50° C., 0.1 mm., was a soft, dark amber resin of neutral equivalent 395; theory for four succinyl groups is 397. In the D-665, M-400 anti-rust test, the compound had a rating of 10 at a 24-hour exposure with a dosage of 10 pounds/1000 barrels gasoline. Results in a simulated manifold deposition test were also satisfactory, and the percentage reduction in screen clogging was 93.1%, at a dosage of 10 pounds/1000 barrels kerosene.

*Example 5*

A tetrapropenylsuccinyl sucrose containing four succinyl units per sucrose unit was prepared by heating 10.3 grams of sucrose with 31.9 grams of the anhyride in 40 ml. dimethylformamide, the reaction being effected by heating up to 110° C. With the reaction mixture at 90° C., a 26.3 gram amount of 5,5,8,8-tetramethyloct-2-enyl chloride (dodecenyl chloride) was then added, followed by dropwise addition of 12.1 grams triethylamine during 20 minutes at 75–85° C. The reaction mixture was then treated at 85 to 105° for one hour. The reaction mixture was allowed to cool, and white crystals of triethylamine hydrochloride were separated by filtration. A gummy product was obtained by drying the reaction mixture to 110° to 0.1 mm. The saponification equivalent was 330 compared to theory of 316 for the sucrose tetrakis(dodecenyl tetrapropenyl succinate), indicating the compound was obtained in relatively pure form.

*Example 6* n-Alkylamine salts of several tetrapropenylsuccinyl sugars were prepared by contacting the sugars in toluene solution with n-alkylamines. For example, glucose bis (tetrapropenylsuccinate), 3.6 grams, was treated with 5.4 grams of a tallow amine formed by reduction of a tallow acid amide and having principally 16 to 18 carbon atoms such as that sold under the trademark Adogen 170-D. Similarly, sucrose tetrakis(tetrapropenylsuccinate), 3.5 grams, was treated with tallow amine (Adogen 170-D), 2.7 grams, and glucose/sucrose tetrapropenylsuccinate (mole/mole ratio of glucose to sucrose and 2 succinate groups per hexose unit) in an amount of 3.6 grams was treated with 2.7 grams of the same tallow amine. The foregoing tallow amine salts were very effective at 0.5% weight concentration in maintaining a 0.5% weight concentration of carbon black in dispersion in kerosene for a number of hours; the sucrose-containing salts were better in this respect than those containing only glucose, complete separation not being effected even after 17 hours when the sucrose-containing materials were used. It is thus demonstrated that the compounds would be useful as detergents for motor oils, and, moreover, would be ashless because of their organic composition. The amine salts of any of the poly-O-(β-carboxyacyl) carbohydrates of the present invention will have value in this application, and amine salts of other O-carboxyacyl carbohydrates will be similarly affected by incorporation of an amine hydrophobe. As the amine part of such salts, alkylamine are preferred, especially alkyl primary amines of 10 to 20 carbon atoms, particularly n-alkyl primary amines or such tertiaryalkyl primary amines as, e.g., 1,1-dimethyldodecylamine, 1,1-diethylhexadecylamine or branched amines obtained from lower olefin ploymers, e.g., propylenetetramer or pentamer, by the Ritter reaction and available under the trademark Primenes, or various other primary amines containing branched alkyl groups. Mixtures of any of the foregoing or other primary amines are also suitable.

*Example 7*

An 8.55 gram amount of sucrose was heated by an oil bath to approximately 170° C. Tetrapropenylsuccinic anhydride, 26.6 grams containing 0.3 gram triethylenediamine, was then added in three-quarters of an hour. During the reaction, the reaction mixture varied from a semi-liquefied material to a clear solution at the end of the reaction period even though the temperature had been lowered to 140° C. The sucrose tetrakis(tetrapropenylsuccinate) product can be used as such, or, if desired, can be dissolved in solvents for convenient evaluation as in foregoing examples. Although the product may be dissolved in a solvent for use, it is still decidedly advantageous to effect the preparation in the absence of solvent, as the solvents suitable for use in the preparation may not be compatible with contemplated uses for the product, this being especially true in view of the fact that ordinary hydrocarbons are not very effective as solvents in the acylation process.

*Example 8*

Dextrose (D-glucose), 0.05 moles, in 25 ml. dimethylformamide with approximately 0.5 gram triethylenediamine was treated with 0.1 mole of tetrapropenylsuccinic anhydride which was added slowly circa 100° C. The product was heated and aspirated to dryness, and dissolved in hexane. A sample was redried, to a resinous tan powder, which had a neutral equivalent 344, approximating the theoretical 356 for the glucose bis(tetrapropenylsuccinate).

*Example 9*

A benzyl ester of sucrose tris(tetrapropenylsuccinate) was prepared by adding to the specified succinate 20% excess benzyl chloride over the free carboxyls of the succinate, and then adding triethylamine.

Example 10

D-glucose, 9.0 grams anhydrous, was just melted in an oil both at 170° C. Then 26 grams tetrapropenylsuccinic anhydride, containing 0.5 gram triethylenediamine, was added to obtain a smooth melt at about 140° C. The product readily dissolved in toluene. Glucose bis(tetrapropenylsuccinate) decreased the stalling and bucking of an engine when tested under severe carburetor icing conditions at 15 lbs./1000 barrels. The compound retarded rust in an anti-rust test (ASTM D–665, M–400) and the percentage reduction in the screen clogging test was 95%.

Example 11

A 2.7 gram (0.015 mole) amount of glucose and 5.13 grams (0.015 mole) sucrose were melted together, then cooled slightly and 23.9 grams (0.09 mole) of tetrapropenylsuccinic anhydride containing triethylenediamine was added at about 150° C. The fairly fluid reaction mixture was stirred during a reaction period of about 40 minutes. The product was cooled slightly and dissolved in toluene. The glucose/sucrose tetrapropenylsuccinate containing about 2 succinate groups per hexose unit had excellent anti-icing properties as demonstrated by cutting the stalling and bucking of an engine in half when employed at a dosage of 15 pounds/1000 barrels winter grade gasoline under severe icing conditions. The compound also retarded rust, and reduced screen clogging about 95.5% at a 10 pound per 1000 barrel dosage.

A sucrose tetrakis(tetrapropenylsuccinate) prepared by a solventless procedure retarded stalling under icing conditions and had excellent anti-rust properties, having a rating of 9.5 at a dosage of 20 pounds per 1000 barrels gasoline in the D–665 test and the percentage reduction in screen clogging was 96%. The anti-rust rating of 9.5 for 24 hours is a vast improvement over the usual 0 to 1 rating at 24 hours with no additive, and in view of the fact that a rating of 7 or so is generally considered a high rating.

In one aspect, the present invention is concerned with light petroleum products, e.g., gasoline and fuel oils, containing specified additives to affect certain properties. In general, this aspect is concerned with treatment of low-boiling fractions of mineral oil, in the gasoline range boiling up to about 200° C., the kerosene range of about 150–250° C., or the fuel oil range of about 250–350° C. However, it may in some cases be desirable to add the materials referred to herein to the crude mineral oil itself to obtain some of the beneficial results. Moreover, some derivatives, for example, the amine salt derivatives discussed herein, are suitable for special applications such as use as detergents in lubricating oils. In general, it is necessary for a gasoline or other petroleum product additive to be hydrocarbon soluble, which partially explains the results obtainable with the long chain $\alpha,\beta$-dicarboxylic acid poly half-esters of mono- and disaccharides of the present invention. It will be realized, however, that with the aid of the present disclosure, it will be possible to vary the structure of such compounds to some extent from the structure taught and still achieve good hydrocarbon solubility and results as petroleum additives, e.g., by varying the size of the hydrophobic group in the dicarboxylic acid and the size of the carbohydrates employed, in conjunction with the molar ratios of the components. For example, with a sufficiently hydrophobic acyl group and a low molecular weight sugar, an average of 1.5 or more carboxyacyl groups per sugar molecule will give hydrocarbon solubility. However, the use of such altered structures is considered within the scope of the present invention involving the use of small amounts of hydrocarbon-soluble O-carboxyacyl mono- or disaccharides as gasoline or fuel oil additives or the like. In employing such soluble additives, very small amounts are generally suitable, for example, from 5 to 100 parts per million by weight, about 20 to 50 parts per million by weight generally being preferred (100 parts per million is about 25 pounds/1000 barrels of gasoline). It will seldom be necessary to employ more than 1% by weight, but in some cases it may be desirable to form concentrates of 5% to 10% or even 50% or more by weight for convenient metering into the gasoline or other petroleum product. It is essential that the O-($\beta$-carboxyacyl) saccharides employed in petroleum compositions according to the present invention have hydrocarbon solubility, ordinarily at least 1% by weight being soluble at room temperature, to achieve the desired effects of the additives and to avoid deposition in use, and preferably 5% or more by weight is soluble, and it is often convenient to prepare 40% or 50% by weight concentrates for convenient metering into petroleum products.

The O-($\beta$-carboxyacyl) saccharides when incorporated in mineral oil fractions in amounts as taught hereinabove are effective in improving various properties of the mineral oil fractions, particularly those related to combustion for various purposes, such as in internal combustion engines, or in oil furnaces for central heating. The compounds incorporated in gasoline are effective in retarding carburetor icing and also in reducing the rusting of metal ordinarily resulting from contact with moist gasolines. The compounds are generally useful as fuel oil additives especially for reducing fouling of apparatus employing fuel oils, such reduction in fouling being indicated by the reduction in screen clogging reported in the examples, and also have a desirable effect on such other properties as illustrated herein.

When gasolines having anti-icing and/or anti-rust properties are prepared according to the present invention, they can also contain other additives common to motor fuels, such as oxidation inhibitors, gum inhibitors, solvents, dyes and the like as well as tetraethyl lead, etc. The various characteristics and compositions of motor fuels are well known and require no detailed description. Similarly, the detrimental effect of carburetor icing on efficiency of motor fuels is well recognized, as shown for example by Jones et al. U.S. Patent No. 2,958,591, incorporated herein by reference, which serves to amplify the importance of the anti-icing results reported in the examples hereinabove. If desired, the dimethylformamide, or other amine or amide or boron compounds reported to have anti-icing effect in the aforesaid patent or references referred to therein can be employed in combination with the anti-icing compound disclosed in the present application.

The aforesaid application S.N. 91,627 of which this application is a division was copending with my application S.N. 594,697 filed June 29, 1956, and issued February 28, 1961, as Patent No. 2,973,353, which claims certain related carbohydrate esters, and application S.N. 850,037, filed November 2, 1959, and issued September 11, 1962, as Patent No. 3,053,830, which claims a process of preparing such related esters.

What is claimed is:

1. A composition comprising a mineral oil material containing a small amount, sufficient to inhibit rusting, of poly-O-($\beta$-carboxyacyl) sugar having at least 10 and no more than 24 carbon atoms in the carboxyacyl group.

2. The composition of claim 1 in which the mineral oil material is a gasoline fraction.

3. The composition of claim 1 in which the mineral oil material is fuel oil.

4. A gasoline having dissolved therein 5 to 100 weight parts per million of a hydrocarbon soluble poly-O-($\beta$-carboxyacyl) sugar having at least 10 and no more than 24 carbon atoms in the carboxyacyl group.

5. A lubricating oil containing a small amount, sufficient to inhibit rusting of a primary amine salt of a poly-O-($\beta$-carboxyacyl) sugar having at least 10 and no more than 24 carbon atoms in the carboxyacyl group.

6. The composition of claim 1 in which the carboxyl group is a carboxylic acid salt of a primary amine.

7. The composition of claim 1 in which the carboxyl group is a carboxylic acid ester.

8. The composition of claim 1 in which the carboxyl group is a free carboxylic acid group and there are 2 to 4 carboxyacyl groups per sugar molecule.

9. The composition of claim 1 in which the sugar is a disaccharide.

10. The composition of claim 1 in which the sugar is a monosaccharide.

11. The composition of claim 1 in which the sugar is sucrose.

12. The composition of claim 1 in which the poly-O-($\beta$-carboxyacyl) saccharide is poly(alkenylsuccinate) of a saccharide.

References Cited by the Examiner

UNITED STATES PATENTS

| | | | |
|---|---|---|---|
| 2,548,347 | 4/1951 | Caron | 44—70 |
| 2,830,021 | 4/1958 | Smith | 252—392 |
| 2,868,629 | 1/1959 | Annable | 44—70 X |
| 2,973,353 | 2/1961 | Gaertner | 260—234 |
| 2,982,634 | 5/1961 | Nygaard | 44—71 |
| 3,046,102 | 7/1962 | Andress | 252—392 X |
| 3,053,830 | 9/1962 | Andress | 260—210 X |
| 3,117,091 | 1/1964 | Staker | 252—396 X |

DANIEL E. WYMAN, *Primary Examiner.*